2,727,821
Patented Dec. 20, 1955

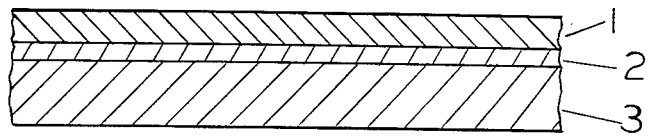
1 = SILVER HALIDE EMULSION LAYER.
2 = COLLOIDAL FILTER LAYER CONTAINING AS THE FILTER DYE A SCHIFF'S BASE DERIVED BY CONDENSING AN ORTHO-HYDROXYALDEHYDE WITH AN O-PHENYLENEDIAMINE, ONE AMINO GROUP OF WHICH IS SECONDARY.
3 = FILM BASE.

2,727,821

PHOTOGRAPHIC FILTER LAYERS IRREVERSIBLY DISCHARGEABLE BY THE USE OF PHOTOGRAPHIC BLEACHING AGENTS

Vsevolod Tulagin, Binghamton, N. Y., assignor to General Aniline & Film Corporation, New York, N. Y., a corporation of Delaware Application May 26, 1954, Serial No. 432,602

8 Claims. (Cl. 95—8)

The present invention relates to irreversibly dischargeable photographic filter and antihalation layers containing as the active filtering agent a yellow Schiff's base of such characteristics that it is capable of being discharged by the usual photographic bleaching baths.

Multilayer color film as presently manufactured is constructed in the form of an integral tripack comprising a base and three superimposed silver halide emulsion layers thereon, sensitized respectively in the order of their arrangement on the base to red, green and blue light.

It is well known that all high speed photographic emulsions are highly sensitive to blue light. However, in multilayer color film, the green and red sensitive emulsions must not respond to exposure by blue light. For this reason, in present day manufacture of such film, there is always present, superimposed on the green sensitive emulsion, a filter layer containing a yellow colorant designed to absorb blue light and prevent its reaching and exposing the green and red sensitive emulsion layers.

The yellow colorant which is so employed must possess certain fundamental characteristics in order to be effective for its intended purpose. In the first place, it must be completely removed during the processing of the film since, otherwise, the entire film would be colored yellow and it would be impossible to obtain white or transparent areas. It is also highly desirable that the yellow colorant be non-migratory in the colloid employed as a carrier therefor. Should the colorant migrate from the filter layer to an adjacent silver halide emulsion layer, it would seriously interfere with the spectral sensitivity of such layer and color degradation would inevitably ensue.

The colorant should be a "brilliant" one; that is to say, the colorant should absorb a large percentage of blue light and yet be almost completely transparent in the green and red regions of the spectrum.

Finally, the colorant must be either water soluble or dispersible in an aqueous solution of the colloid serving as the carrier. Manifestly, in the absence of this property, the difficulties encountered in manufacturing the filter layer would overbalance any other desirable properties possessed by the colorant.

In my U. S. Patent 2,695,233 granted November 23, 1954, entitled "Irreversibly Dischargeable Photographic Filter Layers and Method of Processing Film Containing the Same," I have described a class of minus-blue colorants which can be readily made on a commercial scale and which satisfy all of the above prerequisites. In said application, it is suggested that these yellow colorants be discharged by the utilization of a bath containing a base such as hydroxylamine, hydrazine, semicarbazide or a salt of such base. It has been found in commercial practice, however, that when utilizing such agents to discharge certain of the yellow dyes of my prior application, unexpected difficulties are encountered. Thus, it was learned that certain of the filter dyes when discharged as stated, left objectionable residual stains. In addition, hydroxylamine and hydrazine solutions are highly poisonous and may produce dermatitis in extended use. Again, hydroxylamine reacts readily with sulfite or hyposulfite and hence must be used as a separate bath, thereby introducing an extra step in the processing of the color film. Finally, the discharge agents mentioned in the prior application are not stable and would have to be replaced at least once a week.

In my U. S. Patent 2,687,353 granted August 24, 1954, entitled "Method of Discharging Irreversibly Dischargeable Photographic Filter Layers," it was disclosed that selected yellow dyes within the broad ambit of the earlier application could be discharged by the utilization of aliphatic or aralkyl primary amines. This finding was considered to be a material advance over the invention of the prior application inasmuch as it permitted the utilization of stable non-toxic agents which could effect complete discharge of the dyes without residual stain.

The disadvantages inherent in both of the aforementioned procedures, however, lie in the fact that a special bath is required in order to irreversibly discharge the dyes employed. This means that in processing color film containing the dyes of said applications it is necessary to depart from the usual method of processing involving the employment of the customary bleaching, fixing and similar baths.

It has now been discovered that filter or antihalation layers produced from yellow Schiff's bases may be irreversibly discharged by the usual or customary photographic bleaching agents, such as ferricyanide or acid bichromate solutions, providing that the Schiff's bases are produced by condensing an o-hydroxyaldehyde of the benzene or naphthalene series with an o-phenylenediamine in which one amino group is primary and the other is secondary. The advantages of this discovery are manifest, since patently filter layers containing the involved Schiff's bases permit processing without resorting to special discharging baths. Furthermore, when discharged by the usual silver oxidants, stable products are produced which do not complicate the processing operation, nor act as contaminants in such processing operation.

Light sensitive photographic materials containing the aforesaid Schiff's bases as yellow colorants for filter or antihalation layers, and the processing of such light sensitive materials, constitute the purposes and objects of the present invention.

The yellow Schiff's bases, the use of which is contemplated herein, may be characterized by the following structural formula:

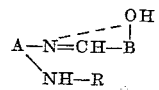

in which A is a phenyl radical, i. e., phenyl, sulfophenyl, sulfo-halogenphenyl, i. e., sulfo-chlorophenyl, sulfo-bromophenyl, and the like, alkoxyphenyl, such as methoxyphenyl, ethoxyphenyl and the like, alkylphenyl, such as toluyl, ethylphenyl and the like, alkoxysulfophenyl, such as ethoxysulfophenyl, methoxysulfophenyl and the like, alkoxyalkylphenyl, such as ethoxymethylphenyl, methoxyethylphenyl and the like, R is an aliphatic radical, i. e., alkyl, such as methyl, ethyl, propyl, butyl, amyl, decyl, dodecyl, tetradecyl, octadecyl and the like, hydroxyalkyl, such as hydroxyethyl, hydroxypropyl and the like, carboxyalkyl, such as carboxymethyl, carboxyethyl and the like, sulfoalkyl, such as sulfomethyl, sulfoethyl and the like, acylaminoalkyl, such as acetylaminoethyl, acetylaminobutyl and the like, an aralkyl radical, such as benzyl, sulfobenzyl, menaphthyl and the like, or a radical of aromatic character, such as phenyl, toluyl, sulfophenyl, carboxyphenyl, alkoxyphenyl, such as methoxyphenyl, ethoxyphenyl, and the like, naphthyl, sulfonaphthyl, carboxynaphthyl and the like, pyridyl, quinolyl and the like, and B is an aromatic radical of the benzene or naphthalene series, such as phenyl, naphthyl, sulfonaphthyl, carboxynaphthyl, cyanonaphthyl, nitronaphthyl, sulfophenyl, sulfodiphenyl, alkylphenyl, such as methylphenyl, ethylphenyl and the like.

It is important to point out that the main chromophore in the dyes of the above characteristic is the Schiff's base type double bond between the nitrogen and attached carbon atom. However, it must be remembered that no useful dyes can be obtained unless this chromophore is reinforced by the presence of the hydroxy group in o-position thereto. Such configuration in fact is essential to the dye system. It is supposed that a hydrogen bond is formed between the oxygen and nitrogen atoms. This has been indicated in the above formula by the dotted line running from the hydroxyl group to the nitrogen atom of the azomethine linkage.

Examples of dyestuffs having the above configuration which I have found to be eminently suitable as colorants for filter and antihalation layers are those of the following constitution.

(1) 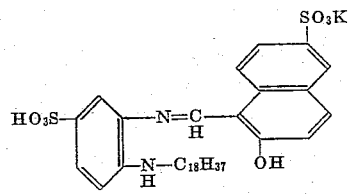

(2) 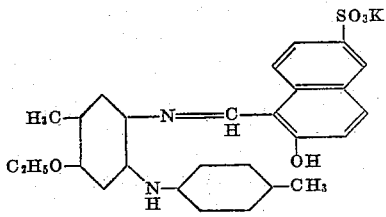

(3) 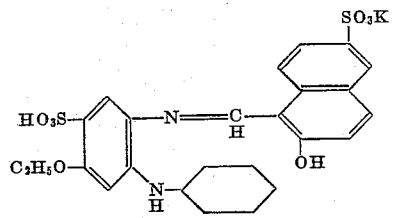

(4) 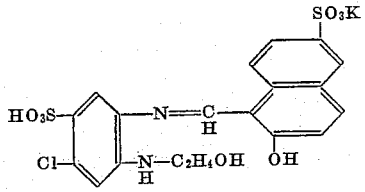

(5) 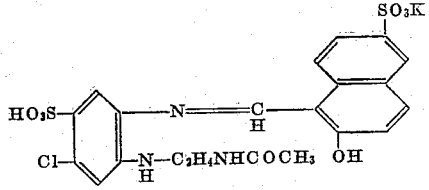

(6) 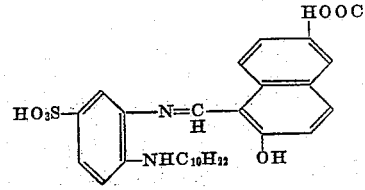

(7) 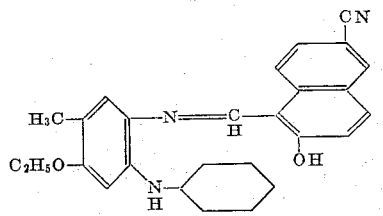

(8) 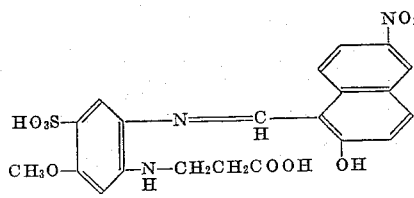

(9) The azomethine from 2-hydroxynaphthaldehyde and 4-sulfomethylamino-metanilic acid
(10) The azomethine from 2-hydroxybenzaldehyde and p-sulfobenzylamino-metanilic acid
(11) The azomethine from potassium-5-formyl-2-hydroxy-benzenesulfonate and 6-chloro-4-ethylamino-metanilic acid
(12) The azomethine from potassium-3'-formyl-4'-hydroxy-4-diphenylsulfonate and 4-dodecylamino-6-ethoxy-metanilic acid
(13) The azomethine from 3-methyl-4-hydroxybenzaldehyde and 1-sulfonaphthylamino-metanilic acid
(14) The azomethine from potassium-5-formyl-6-hydroxy-naphthalenesulfonate and 4-methoxy-2-α-pyridylamino-meta-toluidine
(15) The azomethine from 2-octadecylamino aniline and 2-hydroxybenzaldehyde.

The above compounds are prepared by heating the selected o-hydroxyaldehyde with the selected phenylenediamine, preferably in the presence of acetic acid and pyridine. Examples of suitable aldehydes are 5-formyl-6-hydroxy-2-naphthalene sulfonic acid or its potassium salt; 5-formyl-6-hydroxy-2-naphthoic acid; 2-hydroxy-6-cyano-naphthaldehyde; 2 - hydroxy - 6 - nitronaphthaldehyde; 2-hydroxy-naphthaldehyde; 2-hydroxy-benzaldehyde; 3-formyl-4-hydroxy-benzene sulfonic acid or its potassium salt; 3'-formyl-4'-hydroxy-4-diphenyl sulfonic acid or its potassium salt; 5-formyl-4-hydroxy-toluene and the like.

Any phenylenediamine containing a primary amino group and in ortho-position thereto a secondary amino group in which the substituent is an aliphatic radical, an aralkyl radical or a radical of aromatic character, is effective for condensation with the aldehyde to produce dyes which discharge in the customary photographic bleaching baths. It has been found, however, that the rate and ease of discharge may be influenced by substituents on the phenyl ring and, in this connection, reference is made particularly to the sulfo group, halogen atom, alkoxy group and alkyl group. The sulfo and alkyl group is generally, although not necessarily, positioned para- to the secondary amino group, whereas the halogen atom or alkoxy radical is generally positioned para- to the primary amino group.

Examples of amines which may be condensed with the o-hydroxyaldehydes are 4-methylamino-metanilic acid; 4-ethyl-amino-metanilic acid; 4-propylamino-metanilic acid; 4-decylamino-metanilic acid; 4-tetradecylamino-metanilic acid; 4-octadecylamino-metanilic acid; N-methyl-o-phenylenediamine; N - ethyl-o-phenylenediamine; N-butyl-o-phenylenediamine; N-dodecyl-o-phenylenediamine; N-octadecyl-o-phenylenediamine; 4-hydroxymethylamino-metanilic acid; 4-hydroxyethylamino-metanilic acid; 4-carboxymethylamino-metanilic acid; 4-sulfomethylamino-metanilic acid; 4-phenylamino - metanilic acid; 4-dodecylamino-metanilic acid; 4-benzylamino-metanilic acid; 6-chloro-4-methylamino-metanilic acid; 6-chloro-4-ethylamino-metanilic acid; 6-chloro-4-hydroxyethylamino-metanilic acid; 6-chloro-4-phenylamino-metanilic acid; 6-chloro-4-phenylamino-metanilic acid; 6-chloro-4-naphthylamino-metanilic acid; 6-chloro-4-α-pyridyl-metanilic acid; 6-methoxy-4-methylamino-metanilic acid; 6-ethoxy-4-ethylamino-metanilic acid; 6-ethoxy-4-octadecylamino-metanilic acid; 6-methoxy-4-p-sulfophenylamino-metanilic acid; 6-ethoxy-4(4'-sulfo)naphthylamino-metanilic acid; 6-propoxy-4-α-quinolylamino-metanilic acid; 6-ethoxy-4-methylamino-m-toluidine; 6-ethoxy-4-octadecylamino-m-toluidine; 4-ethoxy-5-ethyl-2-phenylamino-aniline; 4-ethoxy-5-ethyl-2-butylamino-aniline; 3-methyl-4-ethoxy-6-p-toluidino-aniline; 4-phenylamino-6-ethoxy-metanilic acid; 6-chloro-4-ethanolamino-metanilic acid; 6-chloro-4-stearoylaminoethylamino-metanilic acid and the like.

The o-hydroxyaldehydes mentioned above are known compounds. The same applies, at least for the most part, to the o-phenylenediamines condensed with the o-aldehydes. In any case, the latter compounds can be prepared by well-known procedures. For example, compounds having the following configuration may be prepared by heating a 3-nitro-4-chloro-benzenesulfonic acid with the selected amine and subsequently reducing the nitro group to an amino group.

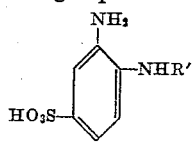

Compounds having the following configuration are obtained by heating 2,4-dichloro-5-nitro-benzene sulfonic acid with the selected amine and subsequently reducing the nitro group.

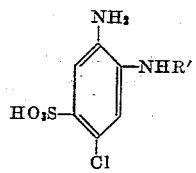

The preparation of this group of compounds by this method is made possible by the fact that the chlorine atom in the 4-position is more easily replaced by an amino group than the chlorine atom in the 2-position. Thus, by refluxing 2,4-dichloro-5-nitro-benzene sodium sulfonate with an equivalent of an amine the chlorine atom in 4-position is selectively replaced by such amine. It is to be noted that this mode of operation is described in U. S. P. 2,570,116, and specifically in column 4 et seq.

Compounds of the following configuration are prepared from the halogenated amine described above by heating the same with a sodium alcoholate to replace the chlorine atom by an alkoxy group.

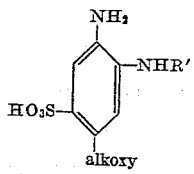

Finally, compounds of the following configuration, particularly where R' is aromatic, are prepared by, for instance, coupling o-cresol with diazotized aniline, converting the azo dye to a sodium salt, heating the resulting salt with ethyl bromide in alcohol and finally effecting the semidine arrangement by heating the ethylated product in hydrochloric acid and stannous chloride.

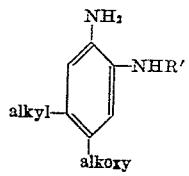

The filter layers of the present invention (it being understood that the term "filter layer" is to be construed to embrace antihalation layers) are prepared by the incorporation of the aforesaid dyes in a colloidal carrier therefor. As the carrier there may be used such colloids as gelatin, polyvinyl alcohol, copolymers of maleic anhydride with methylvinyl ether and the like. Those dyes which are soluble in water may be incorporated in the carrier by adding to a water solution of the selected dyestuff slowly and with agitation a 10% aqueous solution of the desired colloid. Conversely, any of the dyes may be prepared for incorporation in the carrier by dissolving the same in water containing a little pyridine. The solutions thus obtained are then used to dye a foil of the carrier.

The filter dyes, as previously stated, are discharged in the processing of a film containing filter or antihalation layers derived therefrom by processing according to the customary manner while using the standard ferricyanide or acid dichromate bleach solutions. The ease with which the dyes are oxidized is due to the presence of the o-phenylenediamine configuration. It is conceivable that when the dye is discharged it is converted to a stable imidazole which has no deleterious effect on the film or the processing baths. It is noted, in this connection, that if the dyes are discharged by hydroxylamines or by aqueous solutions of primary aliphatic amines, reactive o-phenylenediamines can be detected in the decomposition products. However, where the dyes are treated directly with the usual silver oxidants, only stable products are obtained, none of which displays the reactivity of the phenylenediamines. The fact that the dyes discharge while yielding stable uncolored products is of course a very material desideratum.

The following examples, when taken with the accompanying self-explanatory drawing showing in section a film according to the present invention, will serve to illustrate the invention, it being understood that the invention is not restricted thereto. The parts are by weight unless otherwise stated.

*Example I*

Into a suitable container equipped with a stirrer and a reflux condenser are placed 300 parts of methanol, 30 parts of pyridine and 2 parts of potassium 5-formyl-6-hydroxynaphthalene-2-sulfonate. The mixture is stirred and heated to reflux. An intimate mixture of 22 parts of 4-octadecylamino-metanilic acid and 14.5 parts of 5-formyl-6-hydroxynaphthalene-2-sulfonate is added. (The solids should be firmly ground and screened through a 30 mesh screen.) The resulting suspension is refluxed and stirred for 4 hours. The dye which is formed is collected by filtration, washed with methanol and dried. The material is used without further purification. The dye was dissolved in water mixed with 10% gelatin solution and coated. This dye was found to be readily and quickly discharged by a standard ferricyanide bleach such as Ansco 713.

*Example II*

One mol of 3-methyl-4-ethoxy-6-p-toluidino aniline was dissolved in a 10% solution of pyridine in acetic acid. A slight molar excess of potassium 5-formyl-6-hydroxynaphthalene-2-sulfonate was added and the mixture was boiled for 5 minutes. The dye formed was precipitated by the addition of a large volume of ethyl ether, collected by filtration, washed with acetone and dried. Some of the material was dissolved in 10% aqueous pyridine and the resulting solution was used to dye a layer of gelatin on subbed cellulose acetate film. The dye was quite substantive and was not eliminated even by prolonged washing. The dye, however, could be readily discharged by alkaline aqueous solution of potassium ferricyanide with or without the addition of potassium bromide.

Example III

One mol of potassium 5-formyl-6-hydroxynaphthalene-2-sulfonate was dissolved in a minimum quantity of acetic acid at the boiling point. Pyridine, to the extent of about 10% of the acetic acid used, was added. The resulting solution was treated with somewhat less than 1 mol of 4-phenylamino-6-ethoxy-metanilic acid and the mixture was boiled for 3–4 minutes. The resulting suspension was cooled and the insoluble material was removed by filtration. The filtrate was added to a large volume of acetone. The so-precipitated dye was collected by filtration, washed with acetone and dried. Some of the material was dissolved in 10% aqueous pyridine and a resulting solution was used to dye a layer of gelatin on subbed cellulose acetate. The dye was quite substantive and could not be removed from the gelatin layer by prolonged washing. The dye could be discharged slowly with Ansco 713 ferricyanide bleach. It was rapidly and completely discharged by aqueous alkaline solution of potassium or sodium ferricyanide.

Example IV

The procedure is the same as in Example III, excepting that 6-chloro-4-ethanolamino-metanilic acid is substituted for the 4-phenylamino-6-ethoxy-metanilic acid. This dye is relatively slowly discharged by Ansco 713 bleach and rapidly attacked by alkaline ferricyanide solution.

Example V

The procedure is the same as in Example III, excepting that 6-chloro-4-acetylaminoethylamino-metanilic acid is substituted for the 6-phenylamino-4-ethoxy-metanilic acid. The dye has properties similar to those in the previous examples.

Various modifications of the invention will occur to persons skilled in the art. Thus it is evident that I may use for the formation of the filter or antihalation layers any yellow dye produced by condensing any of the o-hydroxyaldehydes mentioned above with any of the described o-phenylenediamines. I, therefore, do not intend to be limited in the patent granted except as necessitated by the appended claims.

I claim:

1. A light sensitive photographic element comprising a base and a light sensitive silver halide emulsion layer and including a water soluble colloid dyed with a Schiff's base capable of being irreversibly discharged by one of the standard photographic bleaching solutions, said Schiff's base having the following constitution:

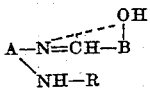

wherein A is a phenyl radical, R is selected from the class consisting of aliphatic radicals, aralkyl radicals, aromatic radicals and nitrogenous heterocyclic radicals in which the hetero nitrogen atom completes a 6-membered unsaturated ring system, B is selected from the class consisting of aromatic radicals of the benzene and naphthalene series, the azomethine linkage in said compounds being in ortho-position to the indicated hydroxyl group and the NH-R group being in ortho-position to said azomethine linkage.

2. The article as defined in claim 1, wherein R is a long chain alkyl radical.

3. The article as defined in claim 1, wherein R is an aralkyl radical.

4. The article as defined in claim 1, wherein the Schiff's base has the following constitution:

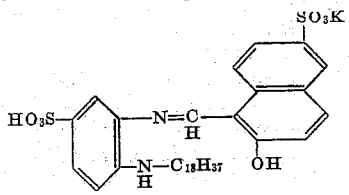

5. The article as defined in claim 1, wherein the Schiff's base has the following constitution:

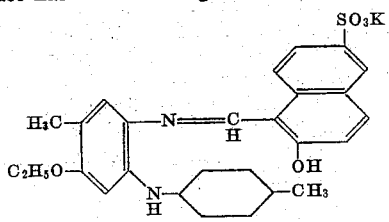

6. The article as defined in claim 1, wherein the Schiff's base has the following constitution:

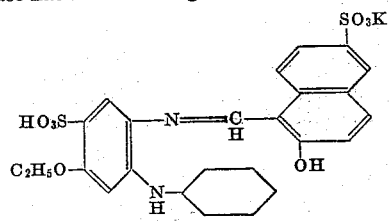

7. The article as defined in claim 1, wherein the Schiff's base has the following constitution:

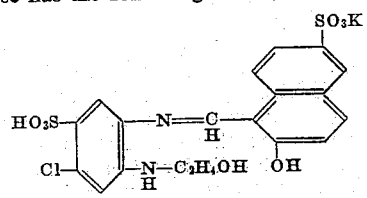

8. The article as defined in claim 1, wherein the Schiff's base has the following constitution:

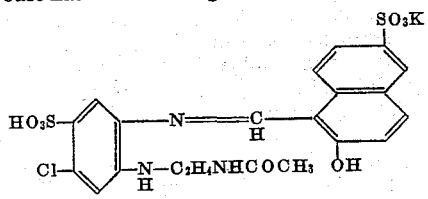

References Cited in the file of this patent

UNITED STATES PATENTS 2,611,697     Stevens et al.            Sept. 23, 1952

FOREIGN PATENTS 622,731     Great Britain            May 6, 1949